United States Patent
Swamypillai et al.

(10) Patent No.: US 11,093,708 B2
(45) Date of Patent: Aug. 17, 2021

(54) ADAPTIVE HUMAN TO MACHINE INTERACTION USING MACHINE LEARNING

(71) Applicant: SOFTWARE AG, Darmstadt (DE)

(72) Inventors: Ganesh Swamypillai, Chennai (IN); Shriram Venkatnarayanan, Chennai (IN); Balaji Balakrishnan, Chennai (IN)

(73) Assignee: SOFTWARE AG, Darmstadt (DE)

(*) Notice: Subject to any disclaimer, the term of this patent is extended or adjusted under 35 U.S.C. 154(b) by 257 days.

(21) Appl. No.: 16/219,209

(22) Filed: Dec. 13, 2018

(65) Prior Publication Data
US 2020/0192976 A1 Jun. 18, 2020

(51) Int. Cl.
| | |
|---|---|
| *G10L 25/63* | (2013.01) |
| *G06F 40/221* | (2020.01) |
| *H04L 12/58* | (2006.01) |
| *G06F 9/54* | (2006.01) |
| *G06F 40/284* | (2020.01) |
| *G10L 17/22* | (2013.01) |
| *G06F 40/30* | (2020.01) |

(52) U.S. Cl.
CPC .............. *G06F 40/221* (2020.01); *G06F 9/54* (2013.01); *G06F 40/284* (2020.01); *G10L 17/22* (2013.01); *H04L 51/02* (2013.01); *G06F 40/30* (2020.01)

(58) Field of Classification Search
None
See application file for complete search history.

(56) References Cited

U.S. PATENT DOCUMENTS

| | | | | |
|---|---|---|---|---|
| 6,604,075 | B1* | 8/2003 | Brown | H04M 3/4938 704/270.1 |
| 7,747,573 | B2* | 6/2010 | Butt | G06F 8/65 707/638 |
| 2014/0040710 | A1* | 2/2014 | Smith | G06F 40/205 715/201 |
| 2014/0046923 | A1* | 2/2014 | Ruble | G06F 3/04847 707/706 |
| 2015/0293961 | A1* | 10/2015 | Migliori | G06F 16/168 707/743 |
| 2016/0162456 | A1* | 6/2016 | Munro | G06F 16/288 704/9 |
| 2016/0162569 | A1* | 6/2016 | Erie | G06F 40/137 707/739 |
| 2016/0343378 | A1* | 11/2016 | Chen | G06F 16/3329 |
| 2017/0185921 | A1* | 6/2017 | Zhang | G06F 8/60 |
| 2018/0285170 | A1* | 10/2018 | Gamon | G06N 7/005 |

(Continued)

OTHER PUBLICATIONS

Yogatama, Dani et al., "Learning to Compose Words into Sentences With Reinforcement Learning" Published as a conference paper at ICLR 2017, 10 pages.

(Continued)

*Primary Examiner* — Seong-Ah A Shin
(74) *Attorney, Agent, or Firm* — Nixon & Vanderhye P.C.

(57) ABSTRACT

A computer system is provided that automatically generates a natural language processing model from a provided API specification. Intent names are based on operation type and name. Entity datasets are constructed based on the generated intent name. A plurality of training phrases are generated based on the entity dataset and an action dataset with a name and corresponding parameters is generated.

18 Claims, 7 Drawing Sheets

(56) References Cited

U.S. PATENT DOCUMENTS

| | | | | |
|---|---|---|---|---|
| 2018/0336269 A1* | 11/2018 | Dobrynin | ................ | G06F 16/93 |
| 2019/0066694 A1* | 2/2019 | Hirzel | .................... | G10L 17/22 |
| 2019/0087401 A1* | 3/2019 | Sanders | ............ | G06F 16/90332 |
| 2019/0103127 A1* | 4/2019 | Tseretopoulos | ....... | G06F 40/247 |
| 2019/0132264 A1* | 5/2019 | Jafar Ali | ................ | G06F 40/30 |
| 2019/0236143 A1* | 8/2019 | Fader | .................... | G06F 40/30 |
| 2019/0258498 A1* | 8/2019 | Chandan | ................ | G06F 40/20 |
| 2019/0377619 A1* | 12/2019 | Riva | ...................... | G06F 9/543 |

OTHER PUBLICATIONS

Enabling interactions with bots, https://api.slack.com/bot-users, Retrieved Dec. 12, 2018, 18 pages.

GitHub, "It is keras based implementation of Siamese architecture using lstm encoders to compute text similarity", https://github.com/amansrivastava17/lstm-siamese-text-similarity, Retrieved Dec. 12, 2018, 3 pages.

Json API, "Chatfuel Documentation", http://docs.chatfuel.com/api/json-api/json-api, Retrieved Dec. 12, 2018, 12 pages.

Vaziri, M., et al. "Generating Chat Bots from Web API Specifications" Onward!' Oct. 25-27, 2017, Vancouver, Canada, 14 pages.

* cited by examiner

ADAPTIVE HUMAN TO MACHINE INTERACTION USING MACHINE LEARNING

TECHNICAL FIELD

Certain example embodiments described herein relate to human-machine interfaces that provide feedback to user provided inputs. More particularly, certain example embodiments described herein relate to chatbots and automatically generating models for chatbots from API specifications.

BACKGROUND AND SUMMARY

Chatbots are computer programs designed to conduct a conversation (usually with a human) via text or speech using natural language. How chatbots are designed and function can vary based on the desired needs of the particular chatbot. In certain instances, chatbots may be configured to communicate with other services to provide answers to input queries from a user. The other services may provide Application Programming Interfaces (APIs) to allow chatbots to obtain information that is relevant to the query received by the chatbot. This can allow a chatbot (and thereby the human interacting with the chatbot) access to resources of an organization's internal systems (e.g., databases, actions that may be taken, etc. . . . ).

Chatbots can accordingly be selected as an interesting and/or interactive medium for providing information and/or actions for people that interact with chatbots. For example, a chatbot may be designed to replace a text based frequently asked questions (FAQ) that is available on a company's website.

An issue with programming, developing, or otherwise constructing a chatbot is the amount of time and/or resources that it can take to complete such a project. Accordingly, new and useful techniques for programming, developing, or otherwise constructing chatbots are sought after.

In certain examples, a computer system is provided that includes an interface to accept an API document or specification of services exposed by application. For example, the API specification may be provided in a format such as swagger or YAML. The API specification may include a domain of interest (e.g., restaurants, transportation, hotels, travel, cooking, etc. . . . ). The API specification may be used to create a chatbot. More specifically, the API specification may be used to create a natural language processing (NLP) model that is used by such a chatbot.

In certain examples embodiments, an NLP model may be created by deriving intents, entities, phrases, actions, and prompts from the API specification. These derived elements may be used to produce an NLP model. In certain example embodiments, the API specification may be thought of as training data that helps to train the NLP model that is created and eventually used by a chatbot.

In certain example embodiments, a computer is provided that automatically generates mappings between NLP actions of an NLP model and API methods that may be provided by one or more exposed APIs. This processing may operate by using the following classification steps: 1) Number of parameters in NLP Action and API Method; 2) NLP Action Type Classification and API Method Type Classification; 3) NLP ActionName and API MethodName comparison; 4) NLP ActionParameterName and API MethodParameterName comparison; and 5) NLP Intent Description/Training phrases and API Method Description comparison. In certain example embodiments, these steps may be processed in the described order to generate pairings for NLP actions and API methods.

It will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
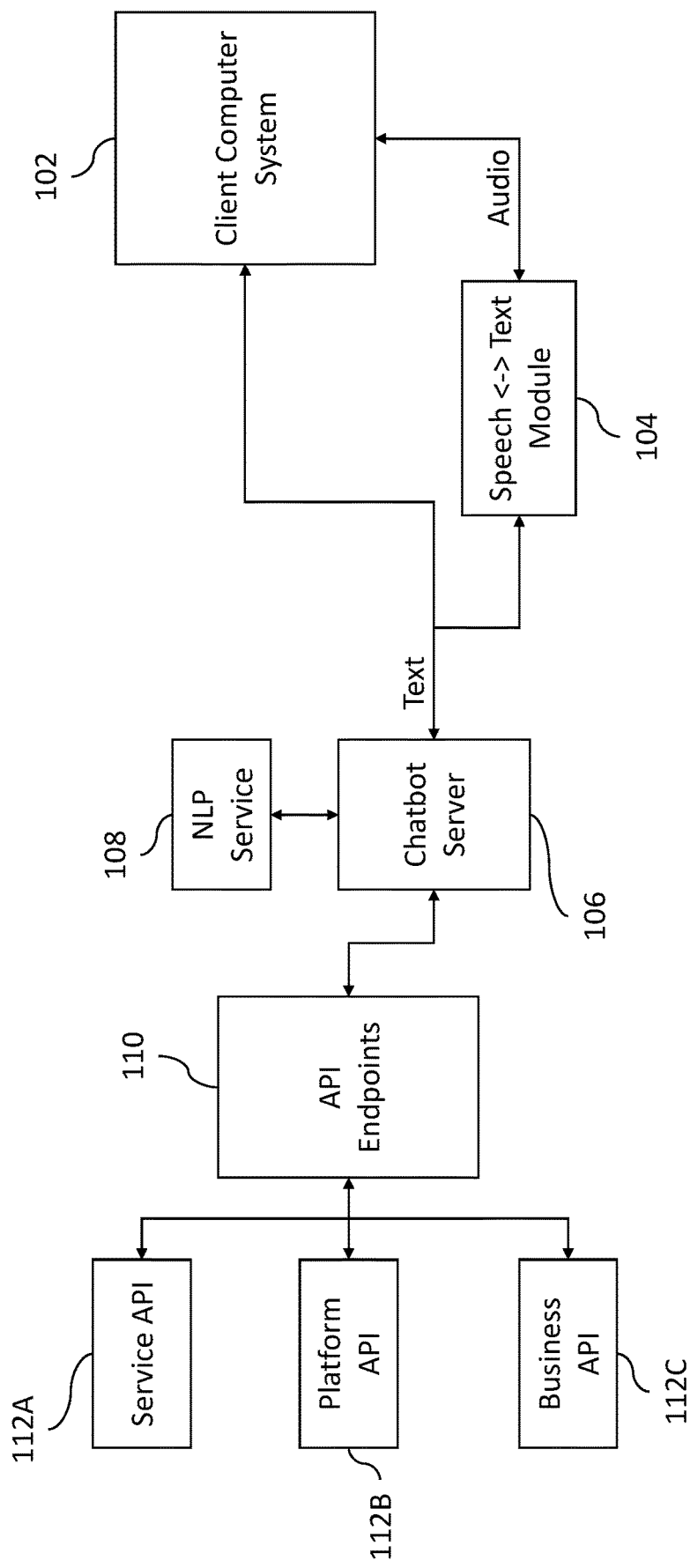
FIG. 1 is a diagram of an example chatbot system according to certain example embodiments.

In the following description, for purposes of explanation and non-limitation, specific details are set forth, such as particular nodes, functional entities, processes, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a process for generating (e.g., automatically) an NLP model is provided. In certain examples, the process for generating the NLP model takes an API specification that is defined in the swagger framework as input. As explained in greater detail herein, swagger (or OpenAPI) may be a framework that is used to describe one or more APIs using a common language. Such frameworks may be useful in providing API documentation and specifications for APIs that are exposed by services.

The NLP model generation process may parse a provided API specification and generate (or derive) intents, entities, phrases, actions, and prompts from the contents of the API specification. These generated elements may be used to generate the NLP model.

In certain example embodiments, a process for mapping (e.g., automatically) the NLP model to respective API methods of one or more services is provided.

The techniques described herein may include reference to the following terms:

NLP Model: NLP model refers to a national language processing model which can include Intents, Entities, Actions, and/or Parameters (which are respectively discussed below). The structure of the NLP model (e.g., how the Intents, Entities, Actions, and/or Parameters are arranged in the model) can facilitate a computer system's (e.g., a chatbot) "understanding" what the user is trying to convey and how the system should respond to that understanding.

Intents: Intent represents a mapping between what a user says (e.g., the input received by the chatbot) and what action should be taken by the system (e.g., the chatbot).

Entities: Entities are the important, relevant, or otherwise desired data that is contained within the unstructured data (e.g., text) that is provided to the system (e.g. the chatbot). The system can tag or identify entities within the unstructured text to, for example, extract parameter values (e.g., date, number, etc. . . . ) from the natural language inputs that are relevant to the query provided by a user.

Actions: An action corresponds to the step the system will take when a specific intent has been triggered by a given recognized input. In certain examples, actions can have parameters for extracting information from user requests.

Action Parameters: Parameters may be elements that are used to connect words to entities in the provided input (e.g., a user's response).

Predefined Entity Set: In certain examples, concepts that are commonly used can be handled with prebuilt entities. Such entities, along with their values, can be automatically provided or loaded by the system (e.g., the chatbot). For example, cuisines may be a predefined entity with values of "Italian", "Continental", "South Indian", and the like. Another example would be having language for a predefined entity with values would be "English", Chinese," and the like. Another example of a predefined entity set may be Currency with values of "Rupee", "Dollar", "Euro", and the like. In certain example embodiments, predefined entity sets may include various collections of proper nouns (e.g., people, places, things, etc. . . . ). Predefined Entity Sets may be defined prior to (or during) performance of the processing and/or techniques discussed herein.

Description of FIG. 1

FIG. 1 is a diagram of an example chatbot system according to certain example embodiments.

In the chatbot system shown in FIG. 1, client computer system 102 is a computer system used by a user to provide input in the form of text, audio, or other format (e.g., via images). In certain examples, the client computer system 102 may be automated to provide or generate textual or audio data independently of human input. Client computer system 102 can include personal computers, mobile devices, automated computer systems, and the like. Generally, client computer system 102 can include any computer system (such as computing device 700 shown in FIG. 7) programmed to accept input from a user and/or provide input to the chatbot server 106 (or components associated therewith, such as text-to-speech module 104).

Client computer system 102 may include, for example a microphone to accept voice input from a user speaking into the microphone or and a keyboard, touchscreen, or other input device (e.g., 712) to accept textual input. In certain examples, the client computer system 102 may be programmed to accept and process an analog signal (e.g., audio or video) and covert that analog signal into digital data that is stored on in memory (e.g., to memory device 706). In certain examples, the client computer system 102 may accept digital data for audio and/or textual data and transmit such data to the chatbot server 106 (or the text-to-speech module 104) for further processing.

Speech to text module 104 is configured to receive audio from the client computer system 102 and convert it to textual input that is then subsequently sent to the chatbot server 106. In certain examples, speech to text module 104 is a software process that is running on a computer system (such as computing device 700 shown in FIG. 7). In certain examples, the computer system running the speech to text module 104 may be the client computer system 102. In certain examples, speech to text module 104 is provided on or in conjunction with the chatbot server 106 (e.g., on the same computing device as the chatbot server 106). In certain examples, the speech to text module 104 is provided on a computer system that is separate from the client computer system 102 and the other computer systems that make up the chatbot system 106 shown in FIG. 1. For example, the speech to text module 104 may be provided as a service over the internet or the like where audio data is provided as input and a textual output is provided in return, which is then passed onto the chatbot server 106.

The speech to text module 104 may also include functionality for translating or converting text that is provided from the chatbot server 106 into speech or audio data. Such audio data may then be processed by the client computer system 102 and output by a speaker that is coupled to the system 102. Thus, the speech to text module 104 may also be used as a text to speech module.

Chatbot server 106 (also called chatbot herein) provides functionality for determining what the text is trying to convey. The chatbot server (e.g., a process running on the underlying hardware resources) may be provided by a computing device, such as computing device 700), which may be a different computing device than is provide for the client system 102 or the speech to text module 104. In certain example embodiments, generating the determination for what the provided text is trying to convey involves using a natural language processing model (an NLP model). This is described in greater detail below.

In certain example embodiments, generating the determination of the textual input may involve using a natural language processing (NLP) service 108. In certain example embodiments, the NLP service 108 uses a NLP model (e.g., NLP model 206) for understanding what a user is trying to say (e.g., what is the purpose or intent of the text that is being processed by the NLP service 108).

The NLP service 108 may be provided on a computer device, such as computing device 700. In certain embodiments, the NLP service 108 may be a cloud based or remote web service. In certain example embodiments, the NLP service is provided on the computer system that is executing a chatbot process (e.g., chatbot server 106). The NLP service 108 may take the text (e.g., chat) from the chatbot server and recognize the intent of the user that initially provided the text. The results of that analysis may then be returned to the chatbot server 106.

API endpoints 110 may be preconfigured connection parameters or the like that allow the chatbot server to interface with API's 112A (e.g. a first API, for example for a social media application API), 112B (e.g., a second API, for example for a ride hailing service), 112C (e.g., a third API, for example for an on-line shopping portal service), etc. . . . . Other types of APIs may also be included. For example, some APIs may be "internal" APIs that are not public, but only usable by the chatbot server. Other APIs may be general public APIs that are used by the chatbot.

In response to the results from the NLP service and/or using an NLP model, the chatbot server may use the endpoints that it contains to invoke the API that is relevant to the user's intent that was expressed in the text provided to the chatbot server 106. The results that are provided by the invoked API may then be passed back through the chatbot 106 and to the client computer system 102.

Figure 2:
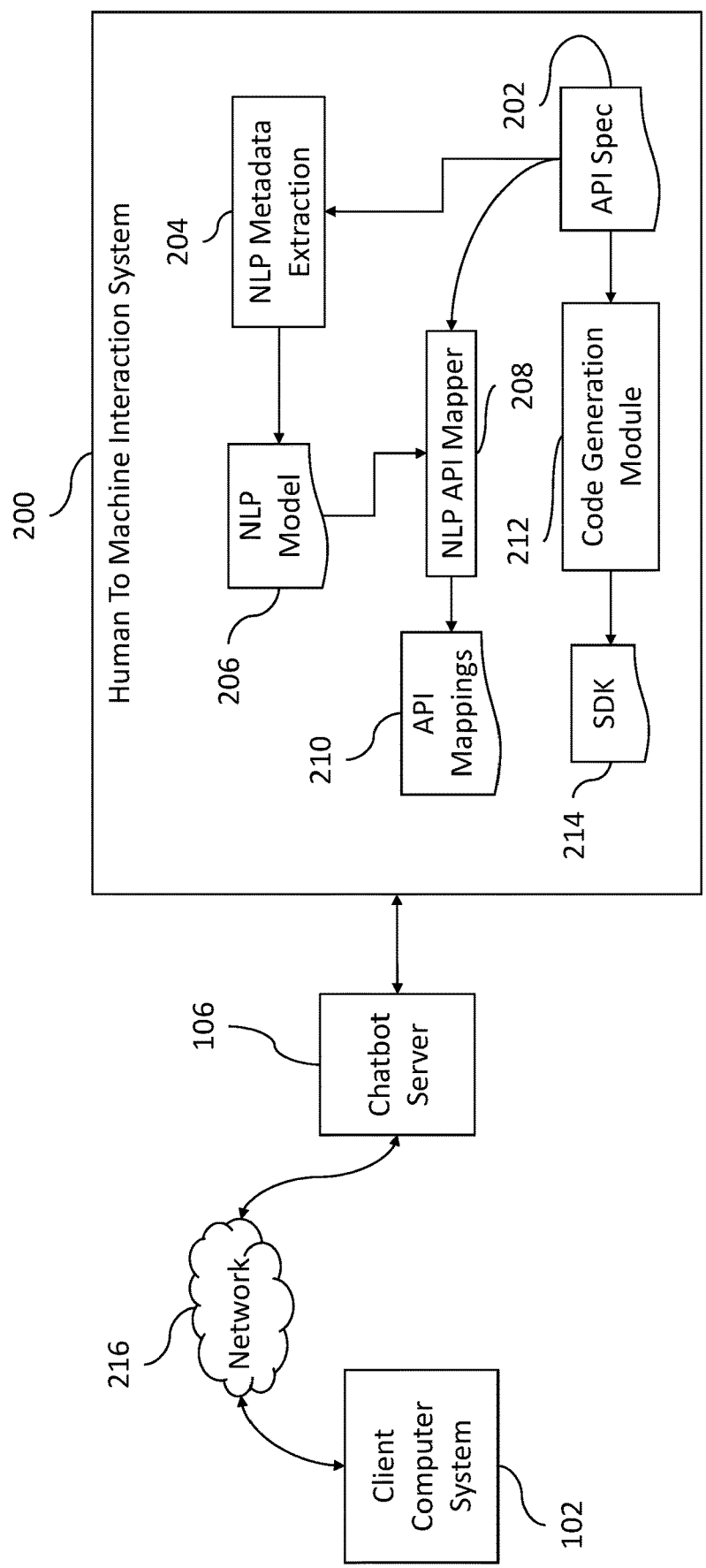
FIG. 2 is a diagram that provides an overview of a system for generating an NLP model and mappings for that NLP model according to certain example embodiments.

Description of FIG. 2

FIG. 2 is a diagram that provides an overview of a system for generating an NLP model 206 and API mappings 210 for that NLP model according to certain example embodiments.

Human To Machine Interaction System 200 is used for generating an NLP model 206 and the mappings 210 between the NLP model and the methods or other actions for one or more exposed APIs. In certain example embodiments, system 200 is included with chatbot server 106. In certain examples, the output from system 200 (e.g., the NLP model 206 and/or API mappings 210) is provided to the chatbot server 106 for processing inputs provided from a client (e.g., as described in FIG. 6).

System 200 takes an API specification 202 as input. As explained herein this may be provided in the form of a swagger (or other format) API specification. The API specification defines how the APIs of the services exposed by API's 112A, 112B, 112C, and the like are to be invoked. In certain example embodiments, system 200 may also accept a target system. A target system may include a NLP service provider or format. For example, a target system may be dialogflow from Google or lex from Amazon. Other systems or platforms may also be specified according to certain example embodiments.

System 200 includes an NLP Metadata Extraction module 204 that takes the API specification 202 as input (and in certain examples a target system) and generates NLP model 206 (or elements that are used in the generation of the model). Further details of the NLP Metadata Extraction module 204 are provided in connection with FIG. 3.

NLP API Mapper module 208 is responsible for mapping NLP actions from the NLP model 206 to methods from the API specification 202. Accordingly, NLP API Mapper module 208 takes both the NLP model 206 and API specification 202 as inputs and produces API mappings 210 as an output.

Code generation module 212 is responsible for generating an SDK 214 corresponding to the API defined in the API specification 202. This takes the API specification 202 as input an produces the SDK 214 as output.

The outputs (e.g., NLP Model 206, API mappings 210, and/or SDK 214) generated by system 200 may then be provided or used by chatbot 106 to enable chatbot functionality for client 102 that provides inputs via network 216 (e.g., the Internet). In certain examples, the NLP model 206 may be integrated or stored to the chatbot server 106 that is providing chatbot functionality to the client computer system 102.

It will be appreciated that the outputs from system 200 may be automatically generated without the need for manual intervention in creating the NLP model 206 and/or the API mappings 210. Using such techniques there is no need for express manual user intervention during the NLP model generation.

Figure 3:
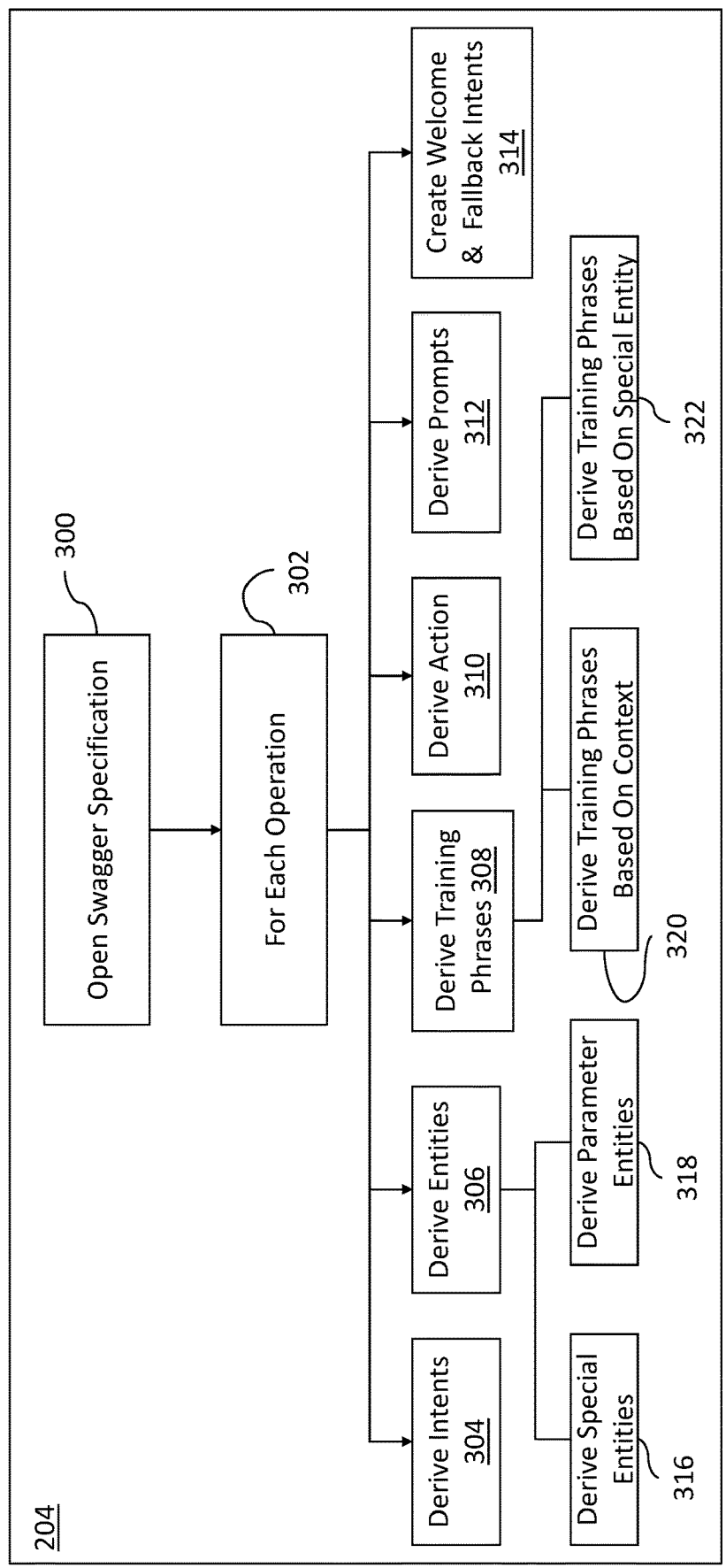
FIG. 3 is diagram showing how NLP metadata is extracted from a provided API specification to generate an NLP model according to certain example embodiments.
Figure 4:
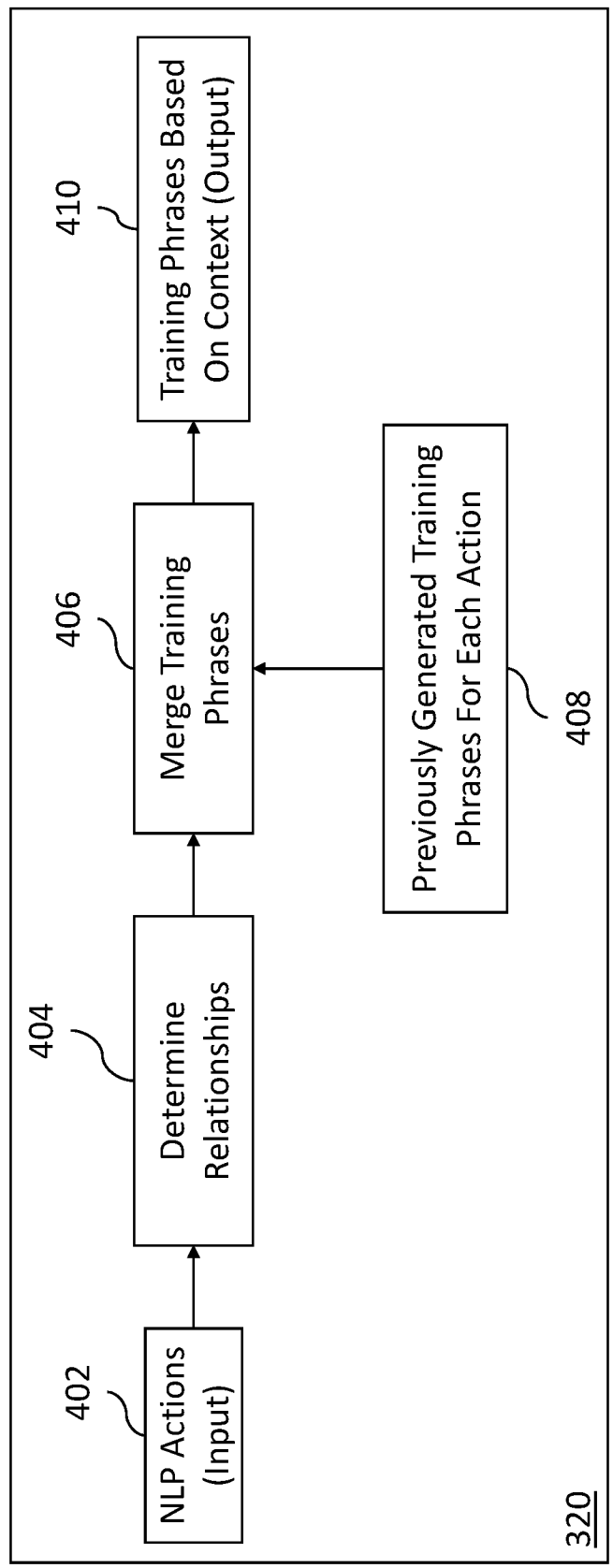
FIG. 4 is a diagram showing how training phrases based on context may be derived in certain example embodiments.

Descriptions of FIGS. 3 and 4—NLP Model Generation

FIG. 3 is diagram showing the processing of the NLP Metadata Extraction module 204 from FIG. 2 according to certain example embodiments. FIG. 4 is a diagram showing how training phrases may be merged.

At 300, an API specification document is accessed and opened. In certain examples, the API specification is a swagger API specification or an OpenAPI specification (swaggers successor). As used herein, the techniques that reference swagger may apply to other types of formats as well. In certain example embodiments, the API specification may be provided in JSON or YAML or other format. The API document that is accessed is then parsed. For example, a SwaggerParser object (or other object that is used for parsing an API specification) may be instantiated and the provided API document may be read and parsed using the parser object.

302 is a loop that occurs for each operation within the API specification. Operations that are defined within the API specification may correspond to each of the HTTP methods that are defined within the specification. In certain examples, a unique operation is a combination of a "path" and an HTTP method that is contained within that path. Thus, in the table 2 example below, the operation is a combination of the path "/search" and the HTTP method "get." In certain examples, operations may be expressed as unique in other ways (e.g., by the number of parameters associated with a given HTTP method within the path). In certain examples, each operation is the "path" from the swagger API defined specification.

In any event, each operation that is defined with the API specification is parsed at 302. In certain example embodiments, each unique operation also triggers the processing associated with steps 304-322 of FIG. 3. In certain example embodiments, the processing shown in FIG. 3 proceeds sequentially from 304, to 306, to 308, to 310, to 312, to 314. As discussed in greater detail below, some of the steps in the described processing use, as input, output from other ones of the steps. For example, the output of 304 (e.g., an intent name) may be used in the processing in 306 for deriving entities.

304 is how intents are derived from the API specification. This may involve extracting an intent name from swagger API specification, where an intent name is a combination of an operation type, operation Name, and a resource Name (e.g., Intent Name=Operation type+Operation Name+Resource Name). An Example code snippet for deriving intents 304 is as follows:

TABLE 1

Derive Intents 304

```
SwaggerParser parser = new SwaggerParser( );
final Swagger swagger = parser.read("restaurantapi.json");
List<String> intentNameList = new ArrayList( );
HashMap mp = ((HashMap)swagger.getPaths( ));
Iterator it = mp.entrySet( ).iterator( );
while (it.hasNext( )) {
    Map.Entry pair = (Map.Entry)it.next( );
    String resourceOperation = pair.getKey( );
    Path path = pair.getValue( );
    if(path.getGet( ) != null)
        intentNameList.add("get" +resourceOperation) ;
    else if(path.getPost( ) != null)
        intentNameList.add("post" +resourceOperation) ;
    else if(path.getPut( ) != null)
        intentNameList.add("put" +resourceOperation) ;
}
```

Other types of intents may be included depending on the types of methods that are defined with the API specification. For example, delete may be another method type.

An example of how intent can be derived can be seen when applied to the example API specification (in swagger) shown in Table 3 below.

TABLE 2

Example API Specification

```
"/search": {
        "get": {
            "tags": [
                "restaurant"
            ],
            "summary": "Search for restaurants".
            "description": "This API allows to search for restaurants given the city name as location",
            "operationId": "search",
            "produces": [
                "application/json",
                "application/xml"
            ],
            "parameters": [
                {
                    "name": "location",
                    "in": "query",
                    "description": "search keyword for city name",
                    "required": true,
                    "type": "string"
                },
                {
                    "name": "count",
                    "in": "query",
                    "description": "max number of results to display",
                    "required": false,
                    "type": "integer"
                },
                {
                    "name": "radius",
                    "in": "query",
                    "description": "radius around city to define search area, defined in meters(M)",
                    "required": false,
                    "type": "number"
                }
            ],
            "responses": {
                "200": {
                    "description": "successful",
                    "schema": {
                        "type": "object",
                        "$ref": "#/definitions/Search"
                    }
                },
```

TABLE 2-continued

Example API Specification

```
                "400": {
                    "description": "failed"
                }
            }
        }
    }
```

Applying the above processing from the derive intents 304 step (e.g., an Example of which is shown in Table 1 above) to the snippet shown in Table 2 yields the following: pair.getKey( ) is "search" (e.g., the operationId), the resource is "restaurant", and operationtype is "get". Accordingly, the intentName that is generated for this example operation is "getSearchRestaurant." Generally, each operation that is processed will have a single corresponding intentName that is generated for that operation.

Next derive entities 306 is executed. This includes two sub-tasks, derive special entities 316 and derive parameter entities 318. For derive special entities 316, a special entity is that which assists or helps in identifying intent. In certain examples, a Natural Language Toolkit (NLTK) Wordnet library or database can be used to generate special entity values (e.g., synonyms for certain words).

In certain examples, derive special entities 316 takes the intentName (e.g., generated from 304), the OperationType (e.g., GET, PUT, etc. . . . ) for this operation, and the summary from the swagger documentation as inputs and returns Special Entity Name(s) and Special Entity Value(s) as outputs. In certain examples, a special entity name is generated for each of the intentNames generated by 304.

Generating the Special Entity Name may involve appending a string (e.g., "identifierEntity") to the intentName to come up with a SpecialEntityName. This may be accomplished for each intentName. Accordingly, the intentName of getSearchRestaurant may be used to derive a SpecialEntityName of getSearchRestaurantIdentifierEntity.

Special Entity Values may be generating according the following code snippet that is set forth in Table 3.

TABLE 3

Generate Special Entity Values

```
from nltk.corpus import wordnet
final Swagger swagger = new SwaggerParser( ).read("restaurantapi.json");
List<String> HTTPmethodTypeAndSummary = new ArrayList( );
HashMap mp = ((HashMap)swagger.getPaths( ));
Iterator it = mp.entrySet( ).iterator( );
while (it.hasNext( )) {
    Map.Entry pair = (Map.Entry)it.next( );
    String resourceOperation = pair.getKey( );
    Path path = pair.getValue( );
    if(path.getGet( ) != null) {
        wordnet.synsets("get"); // synonyms of HTTP GET method
        wordnet.synsets(path.getGet( ).getSummary( )); // synonyms of summary
    }
    if(path.getPost( ) != null) {
        wordnet.synsets("post"); // synonyms of HTTP POST method
        wordnet.synsets(path.getPost( ).getSummary( )); // synonyms of summary
    }
}
```

The HTTP method types (e.g., get, post, etc. . . . ) and/or the summary may be obtained via the swagger parser. In certain example embodiments, the method types may be automatically determined based on the paths that are contained in the API specification. In certain examples, synonyms can be obtained via the NLTK Wordnet database. In particular, the NLTK Wordnet database may generate synonyms for the specific method names that are contained within the API specification.

Applying the processing from Table 3 to the API specification from Table 2, the following Special Entity Values may be generated according to certain example embodiments: get Restaurants, fetch Restaurants, list Restaurants, show Restaurants, retrieve Restaurants, find Restaurants, etc. . . . . In this example, fetch, list, show, retrieve, find are synonyms generated from the wordnet database. Naturally, other values may also be generated depending on the feedback from the natural language toolkit and/or synonym generator.

In certain example embodiments, reinforcement learning can be used to compose words into sentences. For example, the techniques described in *Learning to Compose Words into Sentences with Reinforcement Learning* by Yogatama, Dani & Blunsom, Phil & Dyer, Chris & Grefenstette, Edward & Ling, Wang. (2016), may be used. In certain example embodiments, a reinforcement learning method can be used to learn hierarchical structures of natural language sentences. This can beneficially result in learning task-specific composition orders for sentiment analysis, semantic relatedness, natural language inference, and/or sentence generation. Such techniques, for example, can lead to the obtained synonyms of HTTP method types and summary being used to compose into meaningful phrases.

Another part of deriving entities 306 for each operation that is included in an API specification is deriving parameter entities 318. Here, parameters and their default values for each operation in the API specification may be compared with a predefined entity set. If matching entities are found, the values are fetched from those predefined entities. If the values are not found, then an entity is created based on the parameter type defined in the API specification. In certain example embodiments, a default of a string entity type may be used.

Table 4 includes an example code snippet for Derive Parameter Entities 318.

In certain example embodiments, the predefinedEntitySet may be loaded prior to the processing show in Table 4.

While the above aspects are preferably operated in an automated manner, in certain example embodiments the outputs and/or processing may make use of manual intervention. For example, such manual intervention may allow for customization and/or branding in specific cases.

The following swagger (Table 5) and dialog (Table 6) snippets illustrate an example when a parameter belongs to a predefined entity set.

TABLE 5

Example Swagger Snippet - Use of Predefined Entity Set

```
"/search": {
    "get": {
        "tags": [
            "restaurant"
        ],
        "summary": "Search for restaurants",
        "description": "This API allows to search for restaurants for the given cuisine",
        "operationId": "search",
        "produces": [
            "application/json",
            "application/xml"
        ],
        "parameters": [
            {
                "name": "cuisines",
                "in": "query",
                "description": "search keyword for cuisine name",
                "required": true,
                "type": "string"
            },
```

When parsing the above example snippet of the API specification, step 318 will load the predefined entities (e.g., as discussed above) for cuisines when that parameter name "cuisines" is encountered in the parsing.

TABLE 4

Deriving Parameter Entities

```
// a map of resources to a list of operationParameterEntity_Values
// for each resource there is a map of operations
// for each operation there is a list of parameters with possible entity_values
Map<String, Map<String, Map<String, List<String>>>>
resourceOperationParameterEntity_Values = new HashMap( );
For each resource in swagger:
    resourceOperationParameterEntity_Values.put(new HashMap( ));
    For each operation corresponding to resource:
        Map<String, Map<String, List<String>>> OperationParameterEntity_Values = new
HashMap( );
        For each parameter corresponding to the operation:
ParameterEntity_Values = new HashMap( );
            If predefinedEntitySet contains parameter
//Copy the values from predefinedEntitySet for
//this parameter to OperationParameterEntity_Values using //list_of_values
            parameterEntity_Values.put(parameter,list_of_values)
            Else
// parameter does not belong to predefined entity set
            String parameterType = getParameterType(parameter);
            parameterEntity_Values.put(parameter,new ArrayList<parameterType>( )); // based
on parameter type, we will have corresponding ArrayList
```

TABLE 6

Example Dialogue Snippet - Use of Predefined Entity Set

```
0 H: Hi
1 C: Hello, Welcome to the Restaurants Finder.
2   RestaurantBot is here to help you.
3   What would you like to do?
4 H: Could you help me with restaurants
5 C: Could you help me with your cuisines?
6 H: Continental
7 C: Ok, here are the restaurants in Chennai
      Grand Chola, Hablis, Hyatt
8 H: Thank you
```

The above dialog snippet (and the other dialog snippets included herein) are between the Chatbot (denoted with a "C" prefix) and a Human/User (denoted with a "H" prefix). As shown in Table 6, because the predefined entity set contains different values for cuisines, the chatbot is able to recognize the parameter entity value corresponding to cuisines as subsequently use that parameter entity value ("Continental") when interfacing with the relevant API to fetch the appropriate restaurants.

Tables 7 and 8 show an example of when a retrieved parameter does not belong to a predefined entity set

TABLE 7

Example Swagger Snippet - No Predefined Entity Set

```
"/details": {
    "get": {
        "tags": [
            "restaurant"
        ],
        "summary": "Details for restaurants",
        "description": "This API allows to retrieve restaurant details for
the given restaurant name",
        "operationId": "details ",
        "produces": [
            "application/json",
            "application/xml"
        ],
```

TABLE 7-continued

Example Swagger Snippet - No Predefined Entity Set

```
"parameters": [
    {
        "name": "restaurantName",
        "in": "query",
        "description": "details keyword for restaurant name",
        "required": true,
        "type": "string"
    },
```

TABLE 8

Example Dialog Snippet - No Predefined Entity Set

```
0 H: Hi
1 C: Hello, Welcome to the Restaurants Finder.
2   RestaurantBot is here to help you.
3   What would you like to do?
4 H: Could you help me with details of restaurant
5 C: Could you help me with restaurant name?
6 H: Vivanta
7 C: Ok, please confirm whether Vivanta is restaurant name
8 H: Yes
    9 C: Displaying Vivanta details: ( // provides details regarding
      restaurant)
```

As shown in Table 8, because the predefined entity set does not contain names of restaurants, the chatbot is able to recognize this and then request confirmation of the values from the user before proceeding (e.g., with an API call to retrieve the name of the restaurant "Vivanta.")

The next step of the process shown in FIG. 3 involves deriving training phrases 308. This includes two sub-steps or process of Deriving Training Phrases Based on Context 320 and Deriving Training Phrases Based on Special Entity 322.

Deriving Training Phrases Based on Special Entity 322 may use NLTK WordNet to generate training phrases. Training phrases may be generated for a combination of special entity values (step 316), description of each intent, and/or parameter entity values. The special entity values may be based on the results of step 316. The parameter entity values may be based on the results of step 318.

The following code snippet illustrates retrieving the description for each operation within the API specification.

TABLE 9

Pseudo Code For Derive Training Phrases Based On Special Entity

```
from nltk.corpus import wordnet
final Swagger swagger = new SwaggerParser( ).read("restaurantapi.json");
List<String> description = new ArrayList( );
HashMap mp = ((HashMap)swagger.getPaths( ));
Iterator it = mp.entrySet( ).iterator( );
while (it.hasNext( )) {
    Map.Entry pair = (Map.Entry)it.next( );
    String resourceOperation = pair.getKey( );
    Path path = pair.getValue( );
    if(path.getGet( ) != null) {
        description.add(path.getGet( ).getDescription( )); // retrieves the description
    }
```

In certain examples, NLTK WordNet may be used to compose words into meaningful sentences. In certain example embodiments, phrases may be generated for a combination of special entities and the retrieved description.

In certain example embodiments, the output (e.g., the list of descriptions that are extracted from the API specification) may be appended with value of parameter entities (e.g., from 318) to form a training phrase set for the intent.

Using the swagger Snippet shown in Table 7, the following training phrases may be derived (e.g., as output) from 322.

TABLE 10

| Output From 322 |
| --- |
| get restaurant details for $restaurantName, <br> fetch the details of restaurant with $restaurantName, <br> retrieve eatery details with $restaurantName, |

The other aspect of deriving training phases 308 includes deriving training phrases based on context 320. Details of the processing that occurs in 320 is shown in FIG. 4, which shows how relationships between actions are determined.

At 402 the NLP actions (e.g., discussed in connection with 310) are used as input. These include all of the NLP actions currently present within an NLP model (e.g., those already generated).

At 404 relationships between the NLP actions are determined. An example of how relationships between actions may be determined is provided in the pseudocode example in Table 11 below. Previously generated training phrases for the actions that are determined to have been related are provided at 408 and combined or merged at 406 with the determined relationships (from 404) to produce training phrases based on context 410 as the output for step 320 of FIG. 3.

Note that the NLP actions that are contained within the model may be derived from multiple different API specifications. For example, one method call from service API 112A may have an output that can be used for the input of platform API 112B. This may allow relationships to then be identified across those APIs. Relationships across APIs can be mapped and correspondingly mapped across intents from the NLP model, which can then be wired together using context.

Table 11 includes a pseudocode example for finding relationships between NLP actions. As shown in the below table, each NLP action is taken and iterated over with the other NLP actions. In certain example embodiments, the NLP actions are loaded from an NLP model (e.g., those NLP actions that have already been generated for already processing operations in the API specification). In certain example embodiments, the NLPAction list is generated by calling the processing step for deriving actions 310. In any event, a determination is made as to whether the output of one action is the input of another action. If such a determination is made, then a relationship is formed between those two actions.

TABLE 11

| Relationship Finder Pseudocode Example |
| --- |
| // assume that NLPActions are stored in a list <br> List<NLPAction> nlpActionList = deriveNLPAction( ); <br> For(int i = 0; i< nlpActionList.size( ); i++) <br>     For( int j = i+1; i< nlpActionList.size( ); j++) <br>         NLPAction actionA = nlpActionList.get(i); <br>         NLPAction actionB = nlpActionList.get(j); <br>         If(actionB.getOutput( ).equals(actionA.getInput( )){ <br>             addToRelationPairList(actionB, actionA); <br>         } |

In certain example embodiments, the relationship finder may also be programmed to determine second, third, fourth, or more relationships. For example, if Action A's output is input to Action B, and Action B's output is input to Action C, then a relationship may be formed between Actions A and B, A and C, and B and C. In certain examples, a tree or graph data structure may be used to store relationships and relationships may be determined by walking the edges of the data structure.

The following is an illustrative example of the relationships that may be determined according to certain example embodiments.

TABLE 12

| Example Of Determining A Relationship |
| --- |
| actionA: getRestaurants (location): inputContext: location, output: list of restaurants <br> actionB: getDishes (restaurant): inputContext: restaurant, output: list of dishes. <br> addToRelationPairList(actionB, actionA): <br> getRestaurants(location) --> getDishes(restaurant) |

In the example in Table 12, the input of actionB is output of actionA. Thus, by using the code snippet in Table 11, the two actions (getRestaurants and getDishes) will be considered a relationship pair. Relationship chains may accordingly be formed by finding a link between input and output. If the output of the first action is same as input for second action, then form a chain of these two actions to form a relationship. This may be repeated for all NLP actions.

In certain examples, training phrases that were already generated (e.g., in step 322) may be combined or merged with identified NLP relationships. For example, the entities in the previously generated training phrases may be replaced based on the identified relationships. Consider the following example where there is a relation between getRestaurants (location) and getDishes(restaurant). getDishes(restaurant) may be associated with the phrase "i want dishes for $restaurantName" and getRestaurants(location) may be associated with the phrase "i want restaurants in $restaurantLocation." Thus combining the identified relationship between getRestaurants and getDishes with the previously generated phrases may yield a phrase of "i want dishes in $restaurantLocation." Other similar phrases may be generated as well based on the results of the previously generated phrases. Such phrases may be incorporated into the NLP model.

The following example swagger (Table 13) and dialog (Table 14) snippets illustrate how this may operate for an example chatbot.

TABLE 13

Swagger Snippet For Derive Training Phrases Based On Context

```
"/search": {
    "get": {
        "tags": [
            "restaurant"
        ],
        "summary": "Search for restaurants",
        "description": "This API allows to search for restaurants in the given location",
        "operationId": "search",
        "produces": [
            "application/json",
            "application/xml"
        ],
        "parameters": [
            {
                "name": "restaurantLocation",
                "in": "query",
                "description": "search keyword for location",
                "required": true,
                "type": "string"
            }
        ]
    }
},
"/search": {
    "get": {
        "tags": [
            "dishes"
        ],
        "summary": "Search for dishes",
        "description": "This API allows to search for dishes in the given restaurant",
        "operationId": "search",
        "produces": [
            "application/json",
            "application/xml"
        ],
        "parameters": [
            {
                "name": "restaurantName",
                "in": "query",
                "description": "search keyword for restaurant name",
                "required": true,
                "type": "string"
            }
        ]
    }
}
```

TABLE 14

Dialog Example

0 H: Hi
1 C: Hello, Welcome to the Restaurants Finder.
2    RestaurantBot is here to help you.
3    What would you like to do?
4 H: Could you help me with restaurants
5 C: Ok, could you help me with your location?
6 H: Chennai
7 C: Ok, here are the restaurants in Chennai --> [call getRestaurants based on location context]
     Taj Coromandel, Gateway, Westin
8 H: Ok, could you help me with dishes
9 C: Ok, could you help me with your restaurant name?
    10 H: Taj Coromandel
    11 C: Ok, please confirm whether Taj Coromandel is restaurant name
    12 H: Yes
    13 C: Displaying dishes from Taj Coromandel: --> [call getDishes based on restaurant context]
    14 H: OK, could you help me with dishes in Chennai area
    15 C: Displaying dishes in Chennai: -->[call getDishes based on location context]

Thus, the training phrase that is based on the relationship between dishes and restaurant is identified and may be used to automatically generate additional training phrases that may be used by the chatbot to understand the context of information presented to it by a user (e.g., getDishes based on location).

Next step 310 will be discussed where action and action parameters may be derived. Pseudocode for how action and action parameters are derived are shown in the following table.

TABLE 15

Derive Action And Parameters Pseudocode

```
For each intent:
    generateAction:
        actionName = intentName
    generateActionParameters:
        For each resource in swagger:
            For each operation corresponding to resource:
                For each parameter corresponding to the operation:
                    Create NLPActionParameter and copy the value of operationParameterName
    to NLPActionParameterName, operationParameterType to
    NLPActionParamterType
```

The "intentName" in Table 15 is the intentName derived as discussed in connection with 304 and Table1. Thus, an example actionName that may be assigned using the swagger snippet from Table 2 would be "getSearchRestaurant" (which is one of the intents that is derived from parsing the swagger snippet shown in Table 2). The action parameters that would then be generated for the getSearchRestaurant action would be: 1) <location, string>, 2)<count, integer>, and 3)<radius, number>. Thus, the action (getSearchRestaurant) may be paired with a set of tuples that represent the possible parameters for this action. In certain example embodiments, additional values may be included for the parameters (e.g., whether they are required parameters or optional).

The following example dialog snippet illustrates how the action (searching for a Restaurant) may be automatically generated to request from the user a location (a parameter in the Restaurant searching).

TABLE 16

Dialog Snippet

0 H: Hi
1 C: Hello, Welcome to the Restaurants Finder.
2   RestaurantBot is here to help you.
3   What would you like to do?
4 H: Could you help me with finding restaurants
5 C: Could you please help me with location?
6 H: Chennai TABLE 16-continued Dialog Snippet 7 C: Ok, here are the restaurants in Chennai
    Taj Coromandel, Gateway, Westin
8 H: Thank you Thus, the action and action parameters can be provided by the user and the chatbot can invoke the corresponding API which is mapped to this action (discussed in greater detail below in connection with Auto Mapping from NLP to API).

In the above example, search is the API which is invoked and the parameters that are passed as the searches method parameters is a location whose value is "Chennai," which is passed by the NLP layer (e.g. the model).

Further, as shown above, the prompts shown to the user—e.g., "Could you please help me with location" is derived as part of derive prompts 312 step (discussed below). The prompts may be related to mandatory parameters for which a user is prompted to provide an input for. These parameters are present as the above discussed actionParameters, whose values are converted to the method parameters from the NLP layer.

At 312 prompts are derived from the API specification. Prompts correspond to mandatory or required parameters for a given action. For example, the restaurant search action defines that the location parameter is required. Step 312 may then determine which parameters are mandatory and generate a prompt in connection with that parameter. For example, a default phrase of "Sony, could you help me with $paramterName" may be used.

The following is an example code snippet for Deriving Prompts.

TABLE 18

Code Snippet for Derive Prompts

```
// map of resources to list of operationprompts
// for each resource, we have a map of operations
// for each operation, we have list of parameters
Map<String, Map<String, List<String>>> resourceOperationPrompts = new HashMap( );
For each resource in swagger:
    resourceOperationPromptsMap.put(new HashMap( ));
```

TABLE 18-continued

Code Snippet for Derive Prompts

```
For each operation corresponding to resource:
    Map<String, List<String>> operationPrompts = new HashMap( );
    operationPrompts.put(operation,new ArrayList<String>( ));
    resourceOperationPromptsMap.put(operation, operationPrompts);
    For each parameter corresponding to the operation:
        If parameter:required is true // mandatory
            operationPrompts.get(operation).add("Could you please help me with $parameter");
```

Accordingly, the response from the Chatbot at line 5 in Table 17 may be automatically generated and provided to the user due to automatically extracting the required parameters from the provided API specification.

At 314, both fallback and welcome intents may be generated. Welcome intents are generally those that are provided to welcome a user. Lines 1-3 of Table 17 are an example of such generated welcome intents. Others include, for example, "Hi there", "Hello", "Greetings", etc. . . . )

Fallback intents are lines the chatbot will provide when it cannot determine the user input and match with any existing intent. Examples of fallback intents could be "Sorry I didn't get that", "I did not understand", "can u say that again", "what was that", etc. . . . .

The following table provides an example code snippet for how such intents may be generated under step 314.

TABLE 19

Code Snippet For Fallback and Welcome

```
generateWelcomeIntent:
    generatePhrases:
        addToPhraseList('Hi there', 'Hello, Welcome to Restaurantsfinder', 'Greetings')
addToIntentList(welcomeIntent)
generateFallbackIntent:
    generatePhrases:
        addToPhraseList('Sorry, I could not understand', 'Can you say that again',
        'I didn't get that')
addToIntentList(fallbackIntent)
```

Once the actions for an NLP model have been generated from a provided API specification according to the processing (e.g., provided by NLP Metadata Extraction module 204) provided in FIGS. 3 and 4, then the generated NLP model may be stored for later use by the chatbot server 106 (e.g., in memory 706 of computing device 700).

Figure 5:
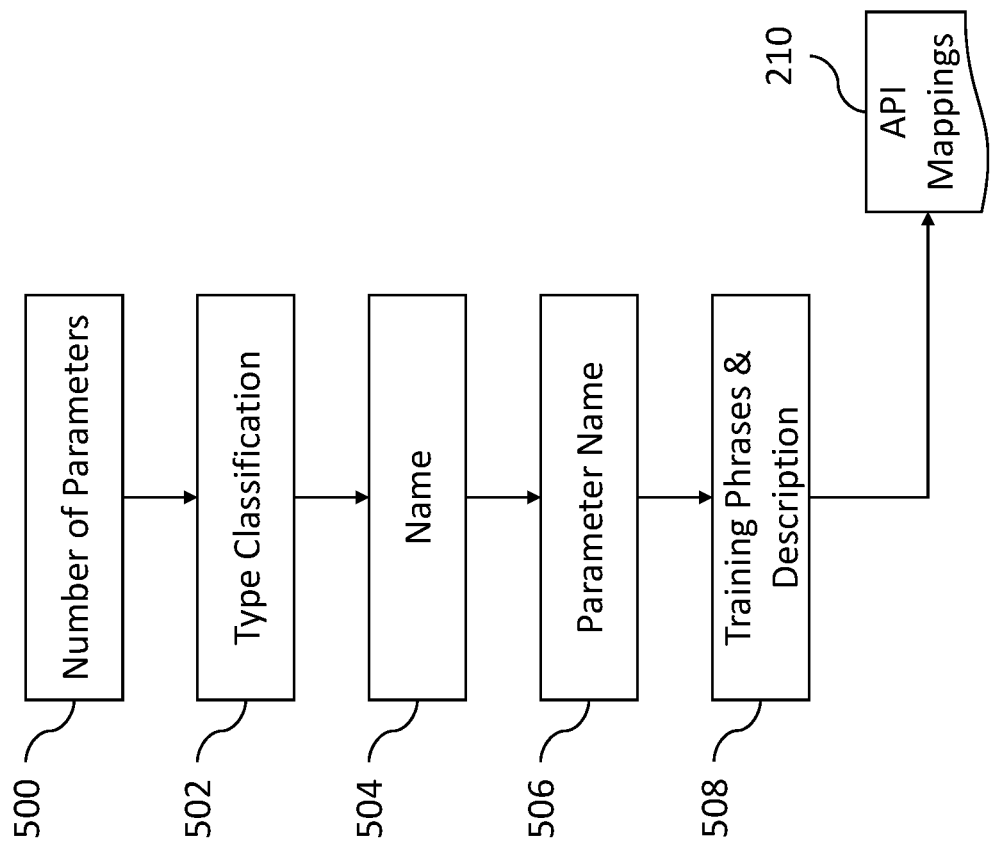
FIG. 5 is a flowchart that describes how mappings between NLP actions and API methods are generated according to certain example embodiments.

Description of FIG. 5—Auto Mapping

FIG. 5 is a flowchart that describes how mappings between NLP actions and API methods are generated according to certain example embodiments.

After generating the NLP model 206, then the system 200 may use the NLP API mapper 208 that takes the NLP model 206 and the API specification 202 to generate mappings 210 for the API methods that are exposed by services 112A, 112B, 112C, etc. . . . . In certain example embodiments, the mappings 210 are generated prior to use by the chatbot 106. For example, once an NLP model 206 is generated, system 200 may proceed to generate mappings 210 for that NLP model. In certain example embodiments, mappings 210 may be generated at runtime or on the fly (e.g., in response to a user request that uses the NLP model).

The NLP API mapper 208 thus creates a mapping between NLPActions in the NLP Model 206 and APIMethods in API specification 202. The mapper may use classification algorithms in order to perform the mapping and there are different ways of relating NLPActions and APIMethods. The classification can be based on the names, parameter names, number of parameters, description comparison, and the like. An example code snippet for classifying is provided below in table 20.

TABLE 20

Classifying Code Snippet

```
# create training data
training = [ ]
output = [ ]
# create empty array for output
output_empty = [0] * len(categories)
```

TABLE 20-continued

Classifying Code Snippet

```
for doc in docs:
    # initialize (bow) for each document in the list
    bow = [ ]
    # list of tokenized words for the pattern
    token_words = doc[0]
    # stem word
    token_words = [stemmer.stem(word.lower( )) for word in token_words]
    # create bag of words array
    for w in words:
        bow.append(1) if w in token_words else bow.append(0)
    output_row = list(output_empty)
    output_row[categories.index(doc[1])] = 1
    # training set contains a bag of words model and the output row which tells
    # category that bow belongs to.
    training.append([bow, output_row])
```

The above snippet may be adapted to different scenarios, whether based on the number of parameters, on names, or other variables.

In certain example embodiments, the process of generating (e.g., automatically) mappings between actions of an NLP model and API methods starts at 500 by comparing the number of parameters of NLP actions to the number of parameters in the API methods defined in the API specification. The actions and methods are then classified according to the number of parameters. The following examples show inputs and outputs for different classifications according to certain example embodiments.

TABLE 21

Example For Number of Parameters 500

Input

| | |
|---|---|
| NLP Actions | [getSearchRestaurants(location), getDishes(restaurant), bookRide(source, destination), getSearchRestaurant(Cuisine)] |
| API Methods | [searchRestaurants(location), findDishes(restaurant), bookRide(source,destination), searchRestaurant(cuisineName)] |

Output

| | |
|---|---|
| 1 Parameter | [getSearchRestaurant(location), getDishes(restaurant), searchRestaurant(location), findDishes(restaurant), getSearchRestaurant(Cuisine), searchRestaurant(cuisineName)] |
| 2 Parameter: | [bookRide(source, destination), bookRide(source,destination)] |

The output from the 500 is then used as the input for the next classification step 502. In 502, the inputs are classified according to the NLP action type and the API method type. In certain examples, this classification may include using additional words for the API methods. For example, HTTP methods like GET, PUT, POST, DELETE can be treated as a text classification problem and machine learning algorithms can be used to map a given word, text, or phrase towards a particular method type. For example, "find some restaurants", "fetch information", "cancel the ride" can be mapped to GET, GET, DELETE respectively. Thus, the training phrases can get pipelined to a machine learning model and the model may classify the phrases as a HTTP Method. In certain examples, the machine learning model may be trained using a training set. An example training set of data is presented below in Table 22. This may also use the classification algorithm shown in Table 20.

TABLE 22

Example For Type Classification 502

Training Set

```
{
    "get": ["show", "get", "retrieve", "list", "pull", "find"],
    "put": ["change", "modify", "revert"],
    "post": ["book", "reserve", "save"],
    "delete": ["cancel", "abort", "terminate"]
}
```

TABLE 22-continued

Example For Type Classification 502

Output

| | |
|---|---|
| GET | [getSearchRestaurant(location), getDishes(restaurant), searchRestaurant(location), findDishes(restaurant), getSearchRestaurant(Cuisine), searchRestaurant(cuisineName)] |
| POST | [bookRide(source, destination), bookRide(source,destination)] |

Thus, the output from table 21 is then used to produce, at 502, the output that is shown in the above table 22.

Next, the NLP action name and the API method names are compared at 504. In certain example embodiments, comparison between an NLP Action Name and an API Method Name may be determined by according to a similarity between them using NLTK WordNet or spaCy (a library that provides national language processing features).

The output from 502 may be used as input for 504. And in 504, employing a comparison between NLP Action Names and API Method Names, output can be generated that further groups the elements according to the similarity between NLP Action Names and API Method Names. An example output that may be generated at 504 using the outputs from table 22 as input is shown in the below table 23.

TABLE 23

Example For Name Comparison 504

Output

1 [getSearchRestaurant(location), searchRestaurant(location), getSearchRestaurant(Cuisine), searchRestaurant(cuisineName)]
2 [getDishes(restaurant), findDishes(restaurant)]
3 [bookRide(source, destination), bookRide(source,destination)]

Next, at 506, the NLP ActionParameterName and the API MethodParameterName are compared using the outputs from 504 as input. As with the name comparison in 504, the parameter comparison may be performed by classifying the terms according to similarity between them using NLTK WordNet or spaCy. An example output that may be generated at 506 using the outputs from table 23 as input is shown in the below table 24.

TABLE 24

Example For Parameter Comparison 506

Output

1 [getSearchRestaurant(location), searchRestaurant(location)]
2 [getSearchRestaurant(Cuisine), searchRestaurant(cuisineName)]
3 [getDishes(restaurant), findDishes(restaurant)]
4 [bookRide(source, destination), bookRide(source,destination)]

Thus, at the 506 comparison, outputs can be further grouped according to the similarity between NLP Action Parameter Names and API Method Parameter Names.

Next, at 508, the NLP Intent Training phrases and API Method Description are compared using the outputs from 506 as input. As with the name comparison in 504 and the parameter comparison at 506, the comparison in 508 may be performed by classifying the textual terms according to similarity between them using NLTK WordNet or spaCy. Thus it will be appreciated that in certain example embodiments, 504, 506, and 508 can be treated as text similarity problem and can be solved using text similarity processing like, for example, Siamese Deep Neural Network, NLTK WordNet, or spaCy.

An example output that may be generated at 508 using the outputs from table 24 as input is shown in the below table 25.

TABLE 25

Example For Training Phrases & Description Comparison 508:

Output

1 [getSearchRestaurant(location), searchRestaurant(location)]
2 [getSearchRestaurant(Cuisine), searchRestaurant(cuisineName)]
3 [getDishes(restaurant), findDishes(restaurant)]
4 [bookRide(source, destination), bookRide(source,destination)]

As can be seen above, the resulting output from 508 (an example of which is shown in Table 25) is set of NLP action and API method pairs. This output may then be used as the basis for forming mappings 210. For example, the "getDishes" NLP Action is now mapped to the "findDishes" API method call. Accordingly, when the NLP Action getDishes is selected in response to the provided input from a user, the chatbot server 106 will be able to invoke the appropriate API method call fishDishes by consulting the generated API mappings 210.

By performing the above sequence of processing in the described order the NLP API mapper 208 may determine mappings that indicate which API call to invoke for a given NLP Action. In sum, the processing may operate by using the following classification steps in order: 1) Number of parameters in NLP Action and API Method; 2) NLP Action Type Classification and API Method Type Classification; 3) NLP ActionName and API MethodName comparison; 4) NLP ActionParameterName and API MethodParameterName comparison; and 5) NLP Intent Description/Training phrases and API Method Description comparison.

While the above is an example of how mappings may be generated, other processing is also contemplated. For example, API mappings may be generated without one or more of the above steps. Alternatively, or in addition, additional steps may be provided.

In certain example embodiments, the API mappings may be dynamically determined in response to selection of a given NLP action. The selected NLP action may then be run through one or more of the above 5 steps to determine the corresponding API method invocation. At 500 those API methods that do not have the same number of parameters may be removed as possible matches. At 502, those API methods that are remaining that do not have the same (or similar) type classification may be removed as possible options. Steps 504, 506, and 508, may then perform the textual classification to determine which terms of the remaining API methods match the selected NLP action.

Figure 6:
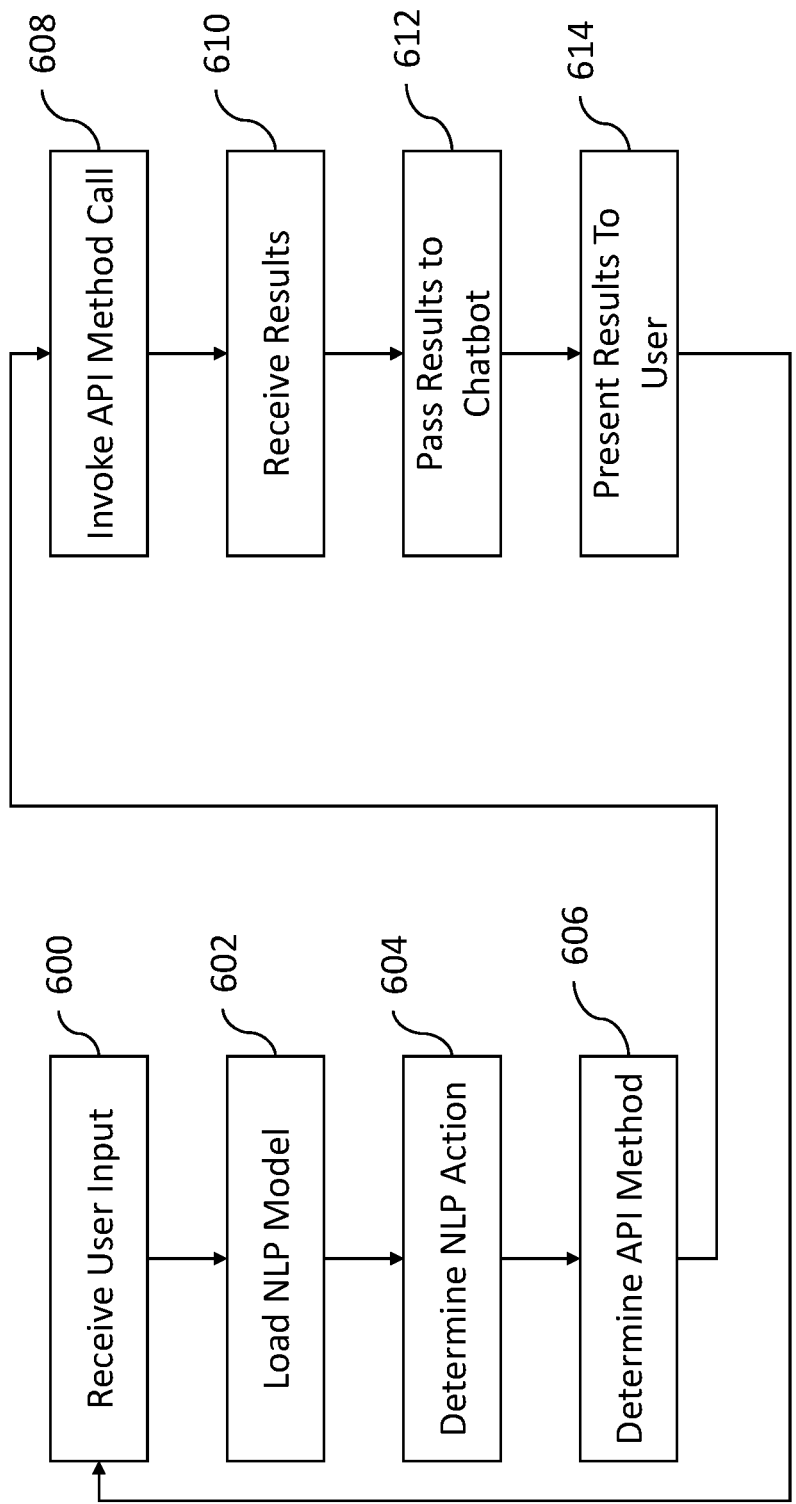
FIG. 6 is a flowchart for how chatbot input may be processed and results may be presented to a user.

Description of FIG. 6—Chatbot Processing

FIG. 6 is a flowchart for how chatbot input may be processed and results may be presented to a user.

At 600, the chatbot server 106 may receive input from a user of client computer system 102. As discussed in connection with FIG. 1, the input may be in the form of text, audio, or the like. The input may be converted into text via a speech to text module 104.

Once the input is provided to the chatbot server 106, an NLP model (such as that generated using the techniques shown in FIGS. 3 and 4) may be loaded from memory (e.g., memory 706) at 602.

The provided user input may then be applied to the NLP model at 604 to determine one or more NLP actions according to the NLP model.

At 606, the process determines the API method to call based on the determined NLP action. This may be accomplished using mappings 210 that have already been generated. In certain examples, 606 may cause the execution of NLP API mapper 208, which may dynamically determine which API method call to use.

In any event, the API method call determined at 606 is then invoked at 608. This may include establishing a connection to a web service and then passing the appropriate parameters for the selected method call. In certain example embodiments, the chatbot server 106 may query the user to provide values for one or more of the parameters. An example of this is shown in table 26.

TABLE 26

Example

1 H: Could you help me with restaurants
[determine that getSearchRestaurants is the NLP action] & [determine that location is a parameters and prompt user for location value]
2 C: Ok, could you help me with your location?
3 H: Chennai
[call getRestaurants based on location context]
4 C: Ok, here are the restaurants in Chennai As shown above a user provides input (line 1) that allows the chatbot server 106 to determine, via the NLP model, that the NLP action is "getSearchRestaurants." This determination also includes determining that location is a parameter for that NLP action. Accordingly, the chatbot server 106 sends a prompt to the user asking for the location (line 2). The user responds with a location (line 3) that is then used to fill in the location parameter for the getSearchRestaurants action. The appropriate API call, searchRestaurants(location), may then be invoked at 608. In certain example embodiments, the request to the service may be a synchronous or asynchronous request.

Results from the API call are received at 610. In certain examples, the results may be formatted and then passed to the chatbot server 106 at 612. The formatted results may then be passed back to the client computer system 102 at 614 (e.g., line 4 of the table 26 example). The process then loops around to 600 to wait for further input from a user.

Figure 7:
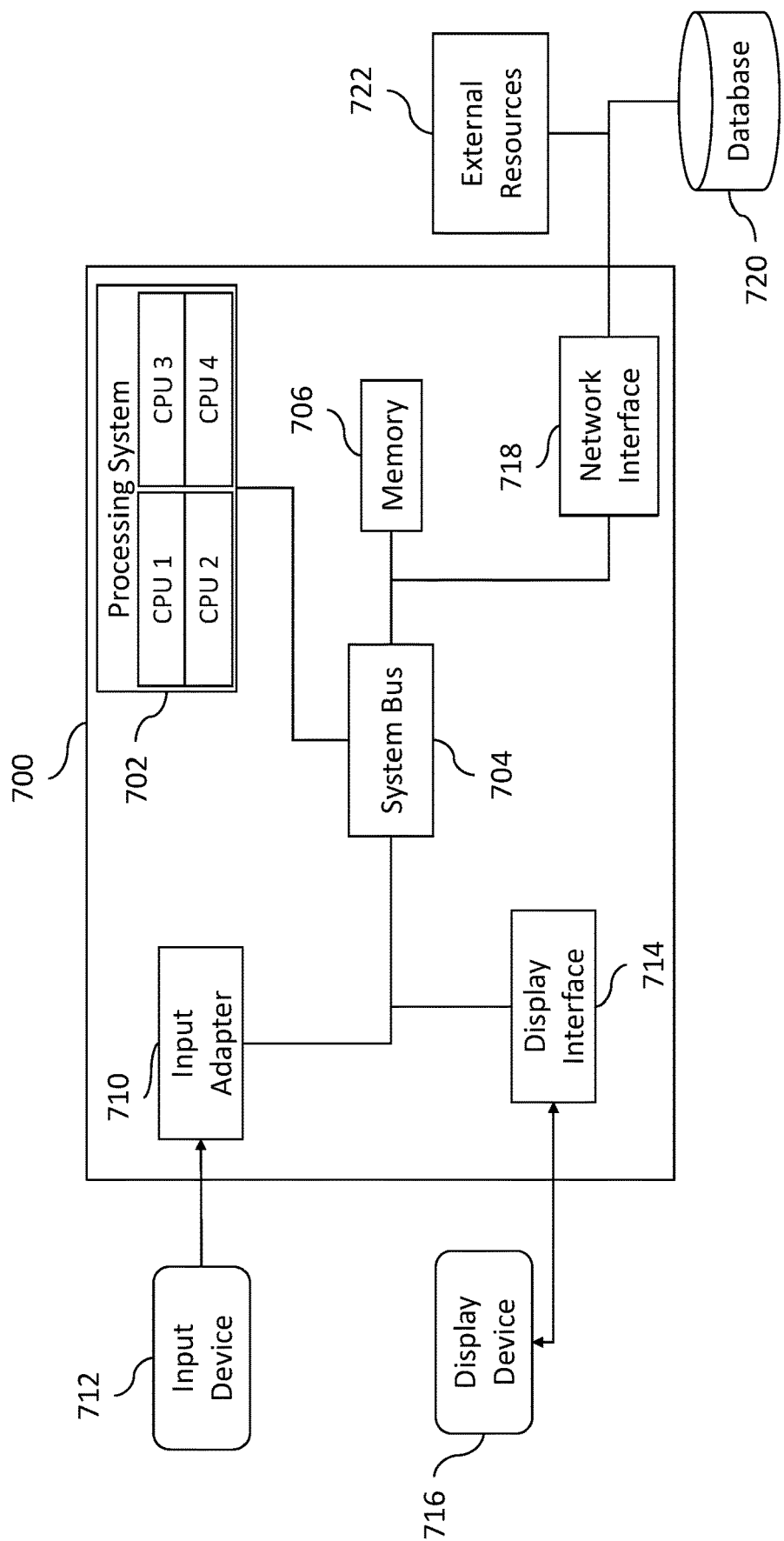
FIG. 7 shows an example computing device that may be used in some embodiments to implement features described herein.

Description of FIG. 7

FIG. 7 is a block diagram of an example computing device 700 (which may also be referred to, for example, as a "computing device," "computer system," or "computing system") herein. In certain examples, the computing device 700 includes one or more of the following: a processing system 702, which includes one or more hardware processors (e.g., central processing units or CPUs); one or more memory devices 706; one or more network interface devices 718; one or more display interfaces 714; and one or more user input adapters 710. Elements of computing device 700 may communicate with one another via system bus 704. Additionally, in some examples, the computing device 700 is connected to or includes a display device 716, user input device 712, database 720, and/or external resources 722 (which may be another instance of computing device 700. As will be explained below, these elements (e.g., the processing system 702, memory devices 706, network interface devices 718, display interfaces 714, user input adapters 710, display device 716) are hardware devices (for example, electronic circuits or combinations of circuits) that are configured to perform various different functions for the computing device 700.

In some examples, each or any of the processors (e.g., CPUs 1, 2, 3, or 4) of the processing system 702 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, and/or a system-on-a-chip (SOC) (e.g., an integrated circuit that includes a CPU and other hardware components such as memory, networking interfaces, and the like). In certain examples, each or any of the processors may use an instruction set architecture such as x86 or Advanced RISC Machine (ARM).

In some examples, each or any of the memory devices 706 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors of the processing system 702). Memory devices 606 are examples of non-transitory computer-readable storage media.

In some examples, each or any of the network interface devices 718 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some examples, the transmitter and receiver of a transceiver may not share any common circuitry and/or may be in the same or separate housings.

In some examples, each or any of the display interfaces 714 is or includes one or more circuits that receive data from the processors of the processing system 702, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 716, which displays the image data. Alternatively, or additionally, in some examples, each or any of the display interfaces 714 is or includes, for example, a video card, video adapter, or graphics processing unit (GPU).

In some examples, each or any of the user input adapters 710 is or includes one or more circuits that receive and process user input data from one or more user input devices 712 that are included in, attached to, or otherwise in communication with the computing device 700, and that output data based on the received input data to the processors 702. Alternatively, or additionally, in some examples each or any of the user input adapters 710 is or includes, for example, a PS/2 interface, a USB interface, a touchscreen controller, or the like; and/or the user input adapters 710 facilitates input from user input devices 712, which may include, for example, a keyboard, mouse, trackpad, touchscreen, voice input, etc. . . . . In certain examples, user input adapter 710 may be configured to process data from other types of input sources that are not from a user. For example, user input adapter 710 (e.g., an input adapter) may process data from one or more sensors (e.g., flow, pressure, temperature, or other types of sensors).

In some examples, the display device 716 may be a Liquid Crystal Display (LCD) display, Light Emitting Diode (LED) display, or other type of display device. In examples where the display device 716 is a component of the computing device 700 (e.g., the computing device and the display device are included in a unified housing of, for example, a mobile or tablet device), the display device 716 may be a touchscreen display (e.g., using capacitive or resistive technology to sense a touch) or non-touchscreen display. In examples where the display device 716 is connected to the computing device 700 (e.g., is external to the computing device 700 and communicates with the computing device 700 via a wire and/or via wireless communication technology), the display device 716 is, for example, an external monitor, projector, television, display screen, etc. . . . .

In various examples, the computing device 700 includes one, or two, or three, four, or more of each or any of the above-mentioned elements (e.g., the processing system 702, CPUs 1, 2, 3, or 4, memory devices 706, network interface devices 718, display interfaces 714, and user input adapters 710). In some examples, the computing device 700 includes one or more of: a processing system 702 that includes hardware processors (e.g., CPUs 1, 2, 3, and/or 4); a memory or storage system that includes the memory devices; and a network interface system that includes the network interface devices 718.

The computing device 700 may be arranged, in various examples, in many different ways. As just one example, the computing device 700 may be arranged such that the processors include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 700 may be arranged such that: the processors include two, three, four, five, or more multi-core processors; the network interface devices 718 include a first network interface device that implements Ethernet and a second network interface device that implements WiFi and/or Bluetooth; and the memory devices 706 may include RAM and storage in the form of flash memory or hard disk.

As previously noted, whenever it is described in this document that a software module or software process performs any action, the action is in actuality performed by underlying hardware elements according to the instructions that comprise the software module.

Consistent with the foregoing, in various embodiments, each or any combination of the Service API 112A, Platform API 112B, Business API 112C, API Endpoints 110, Chatbot Server 106, NLP Service 108, Speech to Text Module 104, Client Computer system 102, NLP Metadata Extraction module 204, NLP API Mapper 208, Human To Machine Interaction System 200, each of which will be referred to individually for clarity as a "component" for the remainder of this paragraph, are implemented using an example of the computing device 700 of FIG. 7. In such embodiments, the following applies for each component: (a) the elements of the 700 computing device 700 shown in FIG. 7 (i.e., the one or more of the processors of processing system 702, one or more memory devices 706, one or more network interface devices 718, one or more display interfaces 714, and one or more user input adapters 710), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 706 (e.g., in various embodiments, in a volatile memory device such as a RAM or an instruction register and/or in a non-volatile memory device such as a flash memory or hard disk) and all actions described herein as performed by the software modules are performed by the processors of processing system 702 in conjunction with, as appropriate, the other elements in and/or connected to the computing device 700 (i.e., the network interface devices 718, display interfaces 714, user input adapters 710, input devices 712, and/or display device 716); (c) alternatively or additionally, to the extent it is described herein that the component processes and/or otherwise handles data, in some embodiments, such data is stored in the memory devices 706 (e.g., in some embodiments, in a volatile memory device such as a RAM and/or in a non-volatile memory device such as a flash memory or hard disk) and/or is processed/handled by the processors of the processing system 702 in conjunction, as appropriate, the other elements in and/or connected to the computing device 700 (i.e., the network interface devices 718, display interfaces 714, user input adapters 710, input devices 712, and/or display device 716); (d) alternatively or additionally, in some embodiments, the memory devices 706 store instructions that, when executed by the processors of the processing system 702, cause the processors to perform, in conjunction with, as appropriate, the other elements in and/or connected to the computing device 700 (i.e., the memory devices 706, network interface devices 718, display interfaces 714, user input adapters 710, input device 712, and/or display device 716), each or any combination of actions described herein as performed by the component and/or by any software modules described herein as included within the component.

Consistent with the preceding paragraph, as one example, in an embodiment where an instance of the computing device 700 is used to implement chatbot server 106, memory devices 706 may store NLP model 206 and API mappings 210, API specification 202, and/or store the data described herein as processed and/or otherwise handled by the chatbot server 106, the NLP Metadata Extraction module 204, and/or the NLP API mapper 208. Processing system 702 could be used to operate the chatbot server 106, the NLP Metadata Extraction module 204, and/or the NLP API mapper 208, and/or otherwise process the data described herein as processed by such entities.

The hardware configurations shown in FIG. 7 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 7, (e) via other hardware arrangements, architectures, and configurations, and/or via combinations of the technology described in (a) through (e).

Technical Advantages of Described Subject Matter

In certain example embodiments, NLP models that are used for processing chatbot interactions may be automatically generated from provided API specifications (e.g., that are provided in swagger or another format). This can improve the quality of the chatbot interactions because of the coupling between the generated NLP actions of the NLP model and the supported API methods. In other words, the chatbot may be able to make use of the full capabilities of the provided API and thus provided improved chatbot experiences.

In certain example embodiments, the NLP actions from an NLP model may be processed to automatically map such actions back to API methods. This generation may assist in developing chatbot functionality more efficiently that previous approaches.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-6 may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

What is claimed is:

1. A computer system for generating a natural language processing (NLP) model, the computer system comprising:
 a non-transitory computer readable storage medium configured to store an application programming interface (API) specification, the API specification including a plurality of elements including a plurality operations, which each include an operation type, an operation name, and at least one operation parameter;
 a processing system that includes at least one hardware processor, the processing system configured to:
  parse the application programming interface (API) specification to obtain the plurality of elements;
  automatically generate a NLP model based on performing at least, for each corresponding operation of the plurality of operations from the parsed elements of the API specification,
   (a) generate an intent name based on the operation type of the corresponding operation and the operation name of the corresponding operation,
   (b) generate an entity dataset for the corresponding operation that is based at least in part on the generated intent name,
   (c) generate a plurality of training phrases based on the generated entity dataset,
   (d) generate an action dataset for a NLP action to be included in the NLP model, the action dataset including a name and at least one corresponding parameter, wherein the name of the action dataset is set to the intent name of the corresponding operation and the at least one corresponding parameter is based on the at least one operation parameter of the corresponding operation; and
  provide the generated NLP model to a computer system that provides at least one chatbot to remote computer systems, wherein responses provided by the at least one chatbot are based on the provided NLP model and at least one invocation of a remote computing service that corresponds to at least one method from the stored API specification, wherein generation of the plurality of training phrases for at least a first corresponding operation of the plurality of operations includes determination of a relationship between at least one pair of NLP actions, wherein the relationship is determined by determining that an output for a first NLP action is related to an input for a second NLP action.

2. The computer system of claim 1, wherein the processing system is further configured to:
provide, to the computer system that provides at least one chatbot, an API mapping dataset that includes mappings between NLP actions and API method invocations from the API specification.

3. The computer system of claim 2, wherein the processing system is further configured to:
automatically generate the API mapping based on:
classifying, to obtain first output, NLP actions and API method invocations based on a number of parameters,
further classifying, to obtain second output, the obtained first output based on NLP action type and API method type,
further classifying, to obtain third output, the second output based on a textual similarity comparison of NLP action names and API method names,
further classifying, to obtain fourth output, the third output based on a textual similarity comparison of NLP action parameter names and API method parameter names,
further classifying, to obtain fifth output, the fourth output based on a textual similarity comparison of NLP Intent Training phrases and API method descriptions.

4. The computer system of claim 3, wherein the textual similarity comparisons include generation of textual phrases.

5. The computer system of claim 1, wherein the generated entity dataset includes at least one entity name with a corresponding plurality of entity values,
wherein the plurality of entity values are each based on a combination of a summary of the corresponding operation from the API specification and a word or phrase corresponding to a method type of the corresponding operation.

6. The computer system of claim 5, wherein the word or phrase included in the plurality of entity values includes synonyms for a textual name of the operation type.

7. The computer system of claim 1, wherein the API specification is defined according to swagger or OpenAPI.

8. The computer system of claim 1, wherein generation of at least one of the plurality of training phrases for at least a first corresponding operation includes merging of training phrases from the first NLP action and/or the second NLP action by using the determined relationship.

9. The computer system of claim 1, wherein the relationship between at least one pair of NLP actions corresponding to API method calls from different API specifications.

10. The computer system of claim 1, wherein automatic generation of the NLP model further includes, for at least a first operation of the plurality of operations, generation of at least one textual prompt based on determination that the at least one operation parameter for the first operation is a required parameter for a corresponding method invocation.

11. A computer system, the computer system comprising:
a non-transitory computer readable storage medium configured to:
store an application programming interface (API) specification, the API specification including a plurality of elements including a plurality operations, which each include an operation type, an operation name, and at least one operation parameter, and
a natural language processing (NLP) model that includes a plurality of NLP actions;
a transceiver configured to receive input from at least one client computer system; and
a processing system that includes at least one hardware processor, the processing system configured to:
generate a first output by classifying NLP actions and API method invocations according to a number of parameters;
generate second output by classifying the generated first output based on NLP action type and API method type;
generate third output by classifying the generated second output based on a textual similarity comparison of NLP action names and API method names;
generate fourth output by classifying the generated third output based on a textual similarity comparison of NLP action parameter names and API method parameter names;
generate fifth output by classifying the generated fourth output based on a textual similarity comparison of NLP Intent Training phrases and API method descriptions;
generate an API mapping dataset based on the generated fifth output;
execute a chatbot process that communicates with the at least one client computer system;
determine, based on the NLP model, at least one NLP action to take based on received input;
determine, based on the generated API mapping dataset, at least one API method to invoke for the determine at least one NLP action;
invoke the at least one API method; and
communicate, using the chatbot process, a response based on invocation of the at least one API method.

12. The computer system of claim 11, wherein the textual similarity comparisons include generation of textual phrases.

13. A non-transitory computer readable storage medium storing computer readable instructions for use with a computer system that includes at least one hardware processor, and a memory device the stored computer readable instructions comprising instructions that cause the computer to:
parse an application programming interface (API) specification, which is stored on the memory device, to obtain the plurality of elements, the API specification including a plurality of elements including a plurality operations, which each include an operation type, an operation name, and at least one operation parameter;
automatically generate a NLP model based on performing at least, for each corresponding operation of the plurality of operations from the parsed elements of the API specification,
(a) generate an intent name based on the operation type of the corresponding operation and the operation name of the corresponding operation,
(b) generate an entity dataset for the corresponding operation that is based at least in part on the generated intent name,
(c) generate a plurality of training phrases based on the generated entity dataset, (d) generate an action dataset for a NLP action to be included in the NLP model, the action dataset including a name and at least one corresponding parameter, wherein the name of the action dataset is set to the intent name of the corresponding operation and the at least one corresponding parameter is based on the at least one operation parameter of the corresponding operation; and store the generated NLP model to a computer system that provides at least one chatbot to remote computer systems, wherein responses provided by the at least one chatbot are based on the provided NLP model and at least one invocation of a remote computing service that corresponds to at least one method from the stored API specification, wherein generation of the plurality of training phrases for at least a first corresponding operation of the plurality of operations includes determination of a relationship between at least one pair of NLP actions, wherein the relationship is determined by determining that an output for a first NLP action is related to an input for a second NLP action.

14. The non-transitory computer readable storage medium of claim 13, wherein the stored instructions further comprising instructions that cause the computer to:

store, to the computer system that provides at least one chatbot, an API mapping dataset that includes mappings between NLP actions and API method invocations from the API specification.

15. The non-transitory computer readable storage medium of claim 14, wherein the stored instructions further comprising instructions that cause the computer to:

automatically generate the API mapping based on:

classifying, to obtain first output, NLP actions and API method invocations based on a number of parameters, further classifying, to obtain second output, the obtained first output based on NLP action type and API method type, further classifying, to obtain third output, the second output based on a textual similarity comparison of NLP action names and API method names, further classifying, to obtain fourth output, the third output based on a textual similarity comparison of NLP action parameter names and API method parameter names, further classifying, to obtain fifth output, the fourth output based on a textual similarity comparison of NLP Intent Training phrases and API method descriptions.

16. The non-transitory computer readable storage medium of claim 15, wherein the textual similarity comparisons include generation of textual phrases.

17. The non-transitory computer readable storage medium of claim 13, wherein the generated entity dataset includes at least one entity name with a corresponding plurality of entity values, wherein the plurality of entity values are each based on a combination of a summary of the corresponding operation from the API specification and a word or phrase corresponding to a method type of the corresponding operation.

18. The non-transitory computer readable storage medium of claim 13, wherein generation of at least one of the plurality of training phrases for at least a first corresponding operation includes merging of training phrases from the first NLP action and/or the second NLP action by using the determined relationship.

* * * * *